United States Patent
Lin (10) Patent No.: US 8,396,782 B2
(45) Date of Patent: Mar. 12, 2013

(54) CLIENT-ORIENTED, ON-DEMAND TRADING SYSTEM

(75) Inventor: Cheng-Yee Lin, Tualatin, OR (US)

(73) Assignee: International Business Machines Corporation, Armonk, NY (US)

( * ) Notice: Subject to any disclaimer, the term of this patent is extended or adjusted under 35 U.S.C. 154(b) by 2011 days.

(21) Appl. No.: 10/903,176

(22) Filed: Jul. 30, 2004

(65) Prior Publication Data

US 2006/0026087 A1    Feb. 2, 2006

(51) Int. Cl.
     *G06Q 40/00*      (2012.01)
(52) U.S. Cl. .............................. 705/37; 705/39
(58) Field of Classification Search ............... 705/37, 705/39
See application file for complete search history.

(56) References Cited

U.S. PATENT DOCUMENTS

| | | | | |
|---|---|---|---|---|
| 4,799,156 A * | 1/1989 | Shavit et al. | ..................... | 705/26 |
| 5,101,353 A * | 3/1992 | Lupien et al. | ..................... | 705/37 |
| 5,729,594 A * | 3/1998 | Klingman | .................. | 379/93.12 |
| 5,794,207 A | 8/1998 | Walker et al. | .................... | 705/23 |
| 5,862,325 A * | 1/1999 | Reed et al. | .................... | 709/201 |
| 5,873,071 A * | 2/1999 | Ferstenberg et al. | ....... | 705/36 R |
| 5,915,209 A * | 6/1999 | Lawrence | ..................... | 340/3.7 |
| 6,029,175 A * | 2/2000 | Chow et al. | ................... | 707/104.1 |
| 6,073,124 A * | 6/2000 | Krishnan et al. | ................ | 705/59 |
| 6,134,534 A | 10/2000 | Walker et al. | .................... | 705/26 |
| 6,236,972 B1 * | 5/2001 | Shkedy | .............................. | 705/1 |
| 6,260,024 B1 | 7/2001 | Shkedy | ............................. | 705/26 |
| 6,282,550 B1 | 8/2001 | Venkatesan et al. | .......... | 707/104 |
| 6,343,277 B1 | 1/2002 | Gaus et al. | ..................... | 705/37 |
| 6,347,307 B1 * | 2/2002 | Sandhu et al. | .............. | 705/36 R |
| 6,438,594 B1 * | 8/2002 | Bowman-Amuah | .......... | 709/225 |
| 6,519,571 B1 * | 2/2003 | Guheen et al. | .................. | 705/14 |
| 6,567,820 B1 * | 5/2003 | Scheifler et al. | .......... | 707/103 R |
| 6,574,608 B1 | 6/2003 | Dahod et al. | ..................... | 705/26 |
| 6,658,568 B1 * | 12/2003 | Ginter et al. | ................... | 713/193 |
| 6,669,832 B1 | 12/2003 | Saito et al. | ....................... | 205/26 |
| 2001/0034663 A1 * | 10/2001 | Teveler et al. | .................. | 705/26 |
| 2001/0039527 A1 * | 11/2001 | Ordish et al. | .................... | 705/37 |
| 2002/0026398 A1 | 2/2002 | Sheth | .............................. | 705/37 |
| 2002/0038276 A1 * | 3/2002 | Buhannic et al. | ............... | 705/37 |
| 2002/0065737 A1 | 5/2002 | Aliabadi et al. | ................ | 705/26 |
| 2002/0120522 A1 | 8/2002 | Yang | ............................... | 705/26 |
| 2003/0018539 A1 | 1/2003 | La Poutre et al. | ............... | 705/26 |
| 2003/0050897 A1 * | 3/2003 | Altomare | ......................... | 705/64 |
| 2003/0074273 A1 | 4/2003 | Miller et al. | ..................... | 705/26 |
| 2003/0126056 A1 * | 7/2003 | Hausman et al. | ............... | 705/36 |
| 2003/0149653 A1 * | 8/2003 | Penney et al. | ..................... | 705/37 |
| 2003/0236729 A1 * | 12/2003 | Epstein et al. | ................... | 705/36 |
| 2005/0044197 A1 * | 2/2005 | Lai | .................................. | 709/223 |
| 2006/0026090 A1 * | 2/2006 | Balabon | .......................... | 705/37 |

* cited by examiner

*Primary Examiner* — Thomas Dixon
*Assistant Examiner* — Gerald Vizvary
(74) *Attorney, Agent, or Firm* — Walter W. Duft (57) ABSTRACT

A client-oriented, on-demand automated trading system that facilitates client-oriented automated trading with suppliers. A client transaction agent is adapted to provide trading requirements for notification to one or more supplier transaction agents, and to discover automated services provided by or on behalf of one or more suppliers that conform to the trading requirements. A broker is adapted to notify the one or more supplier transaction agents of trading requirements specified by the client transaction agent, and to advise the client transaction agent of automated services that conform to the trading requirements. The supplier transaction agents are adapted to process the trading requirements and register automated services that conform to the trading requirements with the broker.

43 Claims, 9 Drawing Sheets

WSDL File Name "MemoryChipPurchase":

```xml
<?xml version="1.0" encoding="UTF-8" ?>
<definitions name="MemoryChipPurchase"
  xmlns="http://schemas.xmlsoap.org/wsdl/"
  xmlns:soap="http://schemas.xmlsoap.org/wsdl/soap/"
  xmlns:xsd="http://www.w3.org/1999/XMLSchema">

<message name="ChipType">
   <part name="type" type="tns:string">
  </message>

<message name="ChipPrice">
    <part name="price" type="tns:float">
  </message>

<message name="Available">
    <part name="available" type="tns:Boolean">
  </message>

<message name="PurchaseInfo">
    <part name="type" type="xsd:string">
    <part name="quantity" type="xsd:integer">
    <part name="creditcardinfo" type="xsd:integer">
  </message>

<message name="ConfirmOrder">
    <part name="confirmationnumber" type="xsd:integer">
  </message>

<portType name="MemoryChipPurchase_port">

<operation name="PriceofChip">
      <input message="ChipType"/>
      <output message="ChipPrice"/>
    </operation>

<operation name="IsInStock">
      <input message="ChipType"/>
      <output message="Available"/>
    </operation>

<operation name="Purchase">
      <input message="PurchaseInfo"/>
      <output message="ConfirmOrder"/>
    </operation>
  </portType>
```

*FIG. 4A*

```
  <binding name="MemoryChipPurchase_Binding"
type="MemoryChipPurchase_port">
    <soap:binding style="rpc"
transport="http://schemas.xmlsoap.org/soap/http" />

<operation name="PriceOfChip">
       <soap:operation soapAction="urn:MemoryChipPurchase"
/>
       <input>
          <soap:body
encodingStyle="http://schemas.xmlsoap.org/soap/encoding/"
          use="encoded"/>
       </input>
       <output>
       <soap:body
encodingStyle="http://schemas.xmlsoap.org/soap/encoding/"
          use="encoded"/>
       </output>
    </operation>

<operation name="IsInStock">
       <soap:operation soapAction="urn:MemoryChipPurchase"
/>
       <input>
          <soap:body
encodingStyle="http://schemas.xmlsoap.org/soap/encoding/"
          use="encoded"/>
       </input>
       <output>
          <soap:body
encodingStyle="http://schemas.xmlsoap.org/soap/encoding/"
          use="encoded"/>
       </output>
    </operation>

<operation name="Purchase">
       <soap:operation soapAction="urn:MemoryChipPurchase"/>
       <input>
          <soap:body
encodingStyle="http://schemas.xmlsoap.org/soap/encoding/"
          use="encoded"/>
       </input>
       <output>
          <soap:body
encodingStyle="http://schemas.xmlsoap.org/soap/encoding/"
          use="encoded"/>
       </output>
    </operation>
  </binding>
 </definitions>
```

CLIENT-ORIENTED, ON-DEMAND TRADING SYSTEM

BACKGROUND OF THE INVENTION

1. Field of the Invention

The present invention relates to the automation of electronic commerce conducted over a network. More particularly, the invention is directed to techniques for coordinating the exchange of information between transaction partners in order to facilitate the selection and acquisition of goods, services or other subject matter by client entities from supplier entities.

2. Description of the Prior Art

By way of background, the use of communications networks for electronic transactions has become pervasive. In the current state of the Internet, many suppliers of goods, services or other subject matters maintain websites that enable clients to obtain information about supplier offerings, such as identifications of the products, services, or other subject matters being offered, together with their price, availability, etc., and to execute online purchases or other trading transactions. Such suppliers are also increasingly implementing automated web or email service interfaces that facilitate automated trading. These interfaces allow clients to write automated trading applications that can interact with supplier services without human intervention. A typical client automated trading application executes on a general-purpose computer that is connected to the Internet. The client application communicates with a supplier's web or application server running the automated service interface. By selectively invoking desired service features according to its programming logic, the client application is able to conduct online transactions with the supplier server in automated fashion.

The foregoing automation is supported by languages, protocols and specifications such as WSDL (Web Service Definition Language), SOAP (Simple Object Access Protocol) and UDDI (Uniform Description Discovery and Integration). The WSDL language provides a standard mechanism for describing an automated service interface as a set of operations that clients can invoke to facilitate product or service acquisition. By way of example, the operations of a typical automated service interface could allow clients to (1) request a list of products or services, (2) obtain their price and availability, and (3) execute trading transactions. Using WSDL, suppliers can publish detailed specifications of such service operations that clients can use to write the automated trading applications that invoke those services.

The SOAP protocol provides an underlying communication mechanism by which automated trading applications can access the service operations defined in a WSDL specification. The protocol is based on the implementation of service operations as objects that remote applications can interact with using standardized request-response messaging dialogs. Each SOAP message is an XML (extensible Markup language) document that can be sent via HTTP (HyperText Transport Protocol) or SMTP (Simple Mail Transport Protocol). Thus, when a client automated trading application requires a list of products or services from a supplier, the client application can send the supplier's server an XML document containing a SOAP request message. This message will invoke the supplier object associated with the requested (WSDL-defined) service operation. After processing the request, the supplier's server will send the client an XML document containing a SOAP response message. This message will contain the requested information generated by the service operation object.

The UDDI specification provides a mechanism by which parties with electronic commerce capability can register information about their services in a public registry that is similar in function to a Yellow Pages directory for telephone networks. A party that maintains an online presence can register a profile of itself and its online trading capabilities, and query the profiles of other parties to identify potential trading partners.

Although client-side automation of supplier service interaction is preferable to manual techniques, one disadvantage from the client's perspective is that clients must often consult several potential suppliers to identify the most suitable candidate for providing a product or service of interest. For example, a computer maker requiring memory chips to build its computers may contact the websites of several chip suppliers in order to find the supplier that can best satisfy the client's needs.

Each such supplier will typically provide its own set of supplier service operations. This means that the client cannot write just one automated trading application to interact with the various automated service interfaces of all the suppliers, and will need to deal with each of them individually. In some cases a client needs to acquire several items, and each of the items may be associated with different groups of suppliers. This exacerbates the automation problem by multiplying the number of automated service interfaces exposed to the client. At this point, the automation of supplier service interaction may be more of a burden than a convenience.

It would be desirable, therefore, to provide a technique whereby automated supplier service interaction could be implemented more efficiently on behalf of clients. What is needed is a solution that allows clients to write a minimal number of automated trading applications while maximizing the number of suppliers whose automated service interfaces can be accessed by such applications.

SUMMARY OF THE INVENTION

The foregoing problems are solved and an advance in the art is obtained by a novel automated trading system that facilitates client-oriented automated trading with suppliers. The trading system proposed herein allows a client to invoke automated service interfaces associated with several suppliers using a single automated trading application. The system includes a client transaction agent, one or more supplier transaction agents, and a broker. The broker is adapted to notify the one or more supplier transaction agents of trading requirements specified by the client transaction agent and to advise the client transaction agent of supplier automated services that are written in response to (and conform with) the trading requirements.

In another aspect of the invention, a client-oriented, on-demand automated trading support method is provided that includes method steps of notifying one or more supplier transaction agents of trading requirements specified by a client transaction agent, and advising the client transaction agent of automated services offered by or on behalf of one or more suppliers that conform to the trading requirements In another aspect of the invention, a client transaction agent is provided that includes a publication function for publishing trading requirements for notification to one or more supplier transaction agents, and a collection function for collecting information about automated services provided by or on behalf of one or more suppliers that conform to the trading requirements.

In another aspect of the invention, a computer program product is provided for programming a client transaction agent to operate as by publishing trading requirements for notification to one or more supplier transaction agents, and collecting information about automated services that conform to the trading requirements provided by or on behalf of one or more suppliers.

In another aspect of the invention, a client transaction support method is provided that includes publishing trading requirements for notification to one or more supplier transaction agents, and collecting information about automated services that conform to the trading requirements provided by or on behalf of one or more suppliers.

In another aspect of the invention, a broker is provided that includes a notification function for notifying one or more supplier transaction agents of trading requirements received from a client transaction agent, a registration function for registering automated services provided by or on behalf of one or more suppliers that conform to the trading requirements, and an advising function for advising the client transaction agent about the registered automated services.

In another aspect of the invention, a computer program product is provided for programming a broker to operate as by notifying one or more supplier transaction agents of trading requirements received from a client transaction agent, registering automated services provided by or on behalf of one or more suppliers that conform to the trading requirements, and advising the client transaction agent about the registered automated services.

In another aspect of the invention, a method for brokering support for automated transactions among compatible trading partners is provided in which a broker registry is established for client transaction agents to publish trading requirements for consumption by supplier transaction agents and for the supplier transaction agents to register automated services for consumption by the client transaction agents that conform to trading requirements.

In another aspect of the invention, a supplier transaction agent is provided that includes a processing function for processing trading requirements specified by a client transaction agent, and a registration function for registering automated services that conform to the trading requirements with a broker.

In another aspect of the invention, a computer program product is provided for programming a supplier transaction agent to operate as by processing trading requirements specified by a client transaction agent, and registering automated services that conform to the trading requirements with a broker.

In another aspect of the invention, a supplier transaction support method is provided that includes processing trading requirements by a client transaction agent, and registering automated services that conform to the trading requirements with a broker.

BRIEF DESCRIPTION OF THE DRAWINGS

The foregoing and other features and advantages of the invention will be apparent from the following more particular description of preferred embodiments of the invention, as illustrated in the accompanying Drawings, in which.

DETAILED DESCRIPTION OF THE PREFERRED EMBODIMENTS

1. Introduction and Definitions

The invention will now be described by way of exemplary embodiments shown by the drawing figures, in which like reference numerals indicate like elements in all of the several views. To facilitate this discussion, it will be helpful to provide a definition of terminology pertaining to the field of the inventive subject matter. As indicated by way of summary above, the invention is directed to an automated trading system that facilitates client-oriented automated trading with suppliers. As will be described in more detail below, the components of the automated trading system include a client transaction agent associated with a client, a broker, and one or more supplier transaction agents associated with respective suppliers. The system allows the client to specify automated trading requirements to the suppliers, who can then write conforming automated service interfaces. Advantageously, the client can engage in transactions with all suppliers who implement such interfaces using a single automated trading application.

As used herein, the term "trading" refers to an activity wherein one party interacts with another party regarding some subject of mutual interest. Trading can be either commercial or non-commercial, and can involve an exchange of consideration or be without consideration. Trading can be consummated by way of a sale, lease, license, bid, promise, pledge, reservation, obligation or fulfillment of obligation, or any other form of undertaking. It can involve any subject matter, whether tangible or intangible. By way of example, trading subject matter can include, but is not limited to, goods, services, monies, commercial paper, loans, mortgages, debts, assurances, benefits, equities, portfolios, accounts, real or personal property, intellectual property, information, collections of information, software, hardware, machines, articles of manufacture, compositions of matter, processes, methods, techniques, as well as any whole or partial right, title, or interest in or to such subject matter.

The term "automated trading" refers to trading using automated means that do not require direct human control (apart from invocation of the automated means).

A "transaction" refers to an interaction between two or more entities for the purpose of trading.

A "client" refers to a party, whether a natural person, a legal entity or otherwise, that engages in trading for the purpose of acquiring.

A "supplier" refers to a party, whether a natural person, a legal entity or otherwise, that engages in trading for the purpose of supplying.

2. First Exemplary Embodiment

Figure 1:
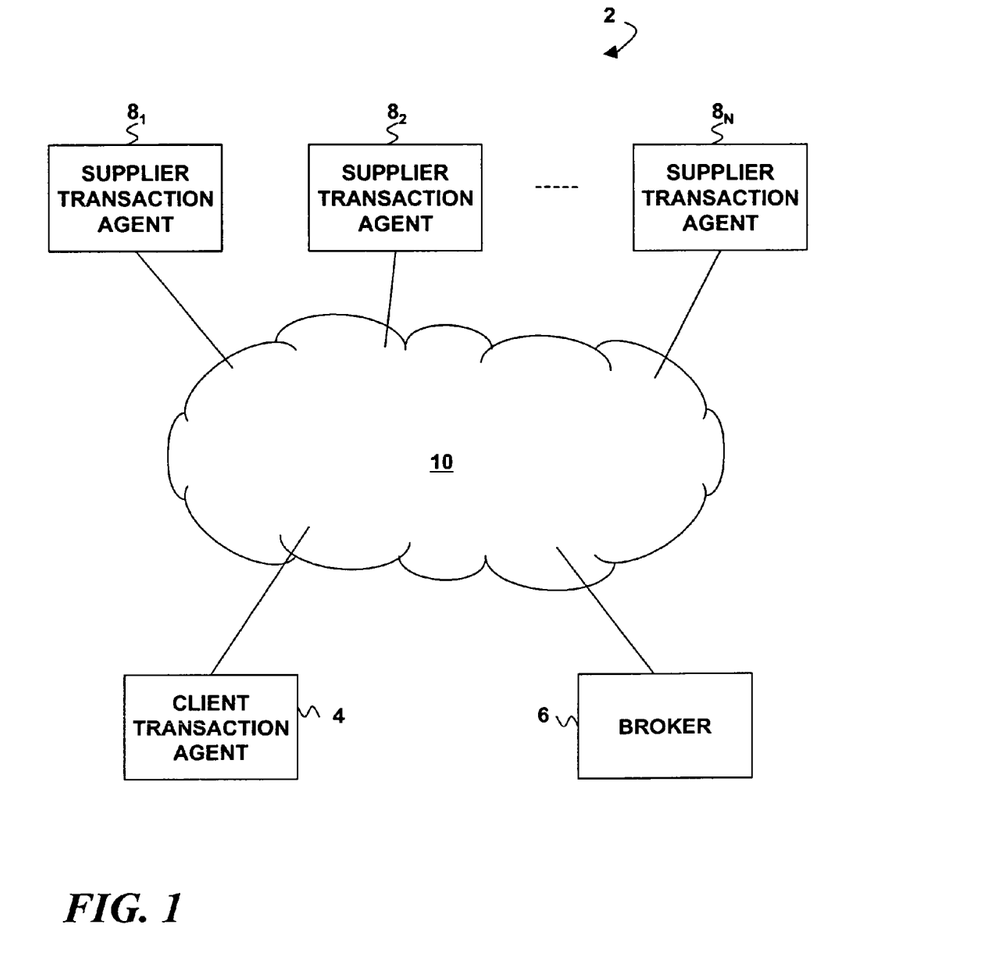
FIG. 1 is a functional block diagram showing a first embodiment of a client-oriented, on-demand automated trading system that contains a client transaction agent, a remote broker, and plural supplier transaction agents.

Turning to FIG. 1, a client-oriented, on-demand automated trading system 2 according to a first exemplary embodiment of the invention includes a client transaction agent 4, a broker 6 and one or more supplier transaction agents $8_1$-$8_n$. Each of these entities can be implemented using conventional computer processing hardware whose operations are suitably programmed to perform automated transaction functions in accordance with the invention. Exemplary systems include, but are not limited to, programmed general purpose computer platforms, such as mainframe computers, midrange computers, workstations, personal desktop computers and laptop computers. Other candidate systems include, but are not limited to, handheld devices, cellular telephones and embedded systems.

The client transaction agent 4, the broker 6 and the supplier transaction agents $8_1$-$8_n$ are interconnected by way of a conventional communications network 10. Examples of suitable network infrastructures include, but are not limited to, public networks, such as the Internet, as well as private networks. With respect to the latter category, a private network could comprise its own physical infrastructure, or could be provided by way of virtual private network connections within a public network. The various communication pathways extending between the network 10 and the client transaction agent 4, the broker 6 and the supplier transaction agents $8_1$-$8_n$ may be provided by electrical or optical wireline connections, wireless connections, or any combination thereof.

The respective functions of the client transaction agent 4, the broker 6 and the supplier transaction agents $8_1$-$8_n$ will now be described with reference to FIG. 2, which illustrates an exemplary sequence of actions that may be performed to implement client-oriented, on-demand trading in accordance with the invention. Reference will additionally be made to FIG. 3, which illustrates functional elements of the client transaction agent 4, the broker 6 and the supplier transaction agents $8_1$-$8_n$ that are used to perform the various actions of FIG. 2.

As discussed by way of background above, a client that needs to consult several suppliers to identify the most suitable candidate for providing a product or service of interest must deal with automated service interfaces that are typically different for each supplier. This makes automated trading cumbersome because the client must often write an interactive application to automate interaction with each service interface.

The solution provided by the invention is to empower the client to specify trading requirements that suppliers will use to conform their automated service interfaces if they wish to be considered by the client for trading. To that end, the client transaction agent 4 is used to publish a client's trading requirements to the broker 6, where they can be accessed by the supplier transaction agents $8_1$-$8_n$ for the benefit of associated suppliers. Suppliers that intend to trade with the client can thus write automated service interfaces that conform to the trading requirements. The supplier transaction agents $8_1$-$8_n$ can then register the automated services with the broker 6. At the time of actual trading, the client transaction agent 4 can collect the registration entries for the suppliers from the broker 6. Using the client transaction agent 4 (or another automated trading application), the client can then query the suppliers through their service interfaces to decide which supplier is the most suitable for the client's needs. The client can then use the client transaction agent 4 (or another automated trading application) to execute a transaction with the selected supplier.

Figure 2:
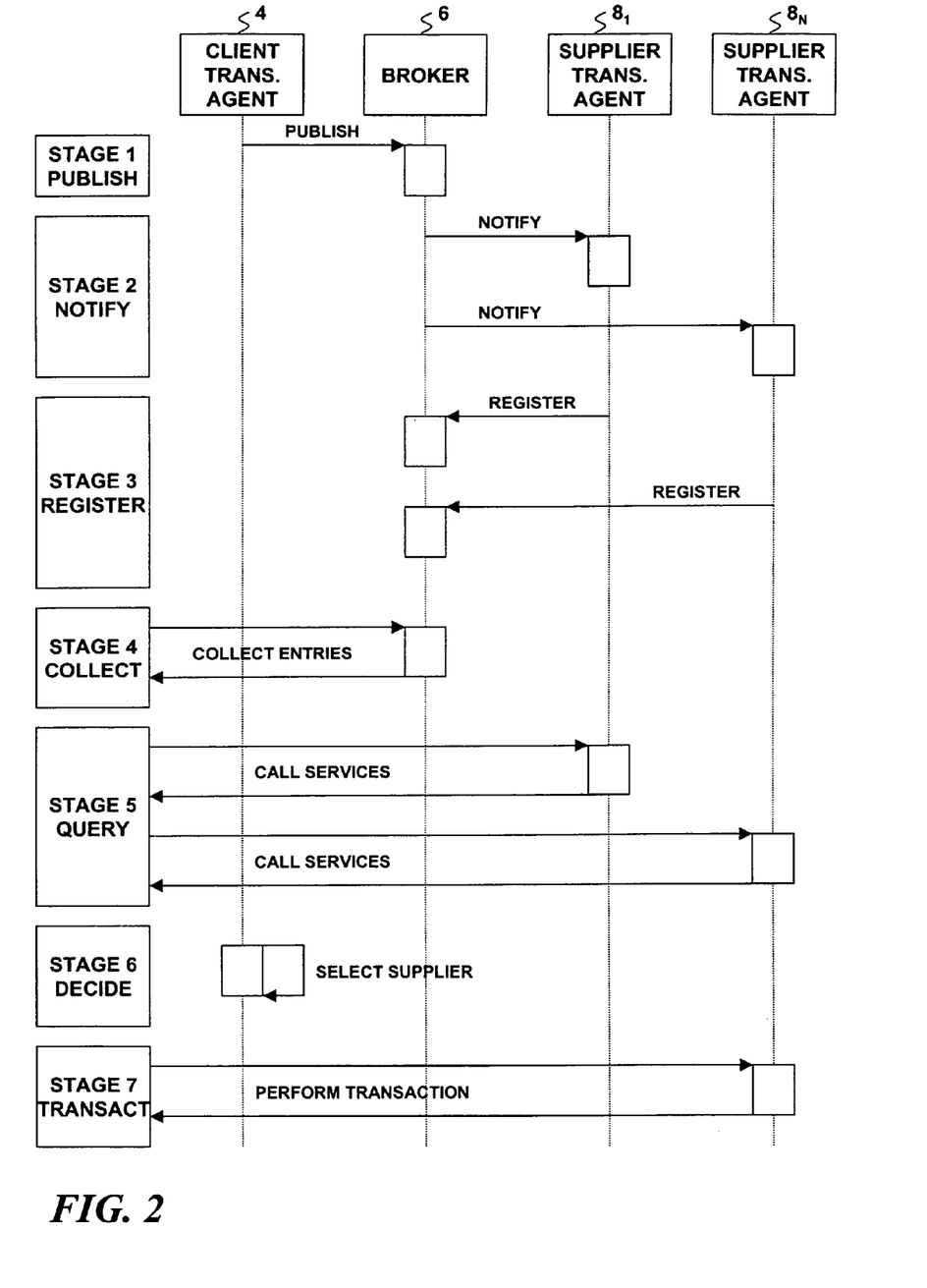
FIG. 2 is a flow diagram showing a sequence of actions performed by the client transaction agent, the broker and the plural supplier transaction agents according to the embodiment of FIG. 1.
Figure 3:
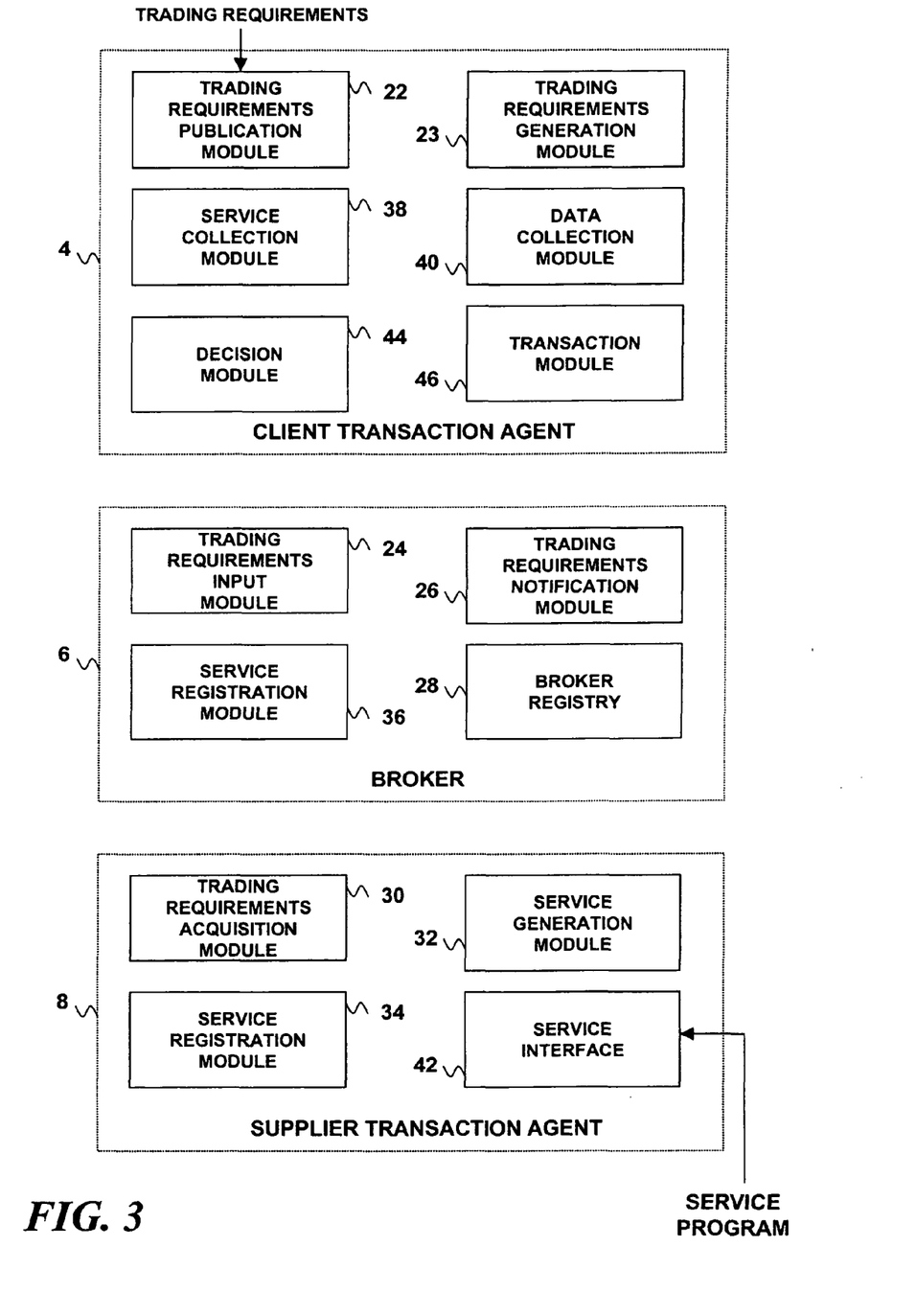
FIG. 3 is a functional block diagram showing components of the client transaction agent, the broker and a supplier transaction agent according to the embodiment of FIG. 1.

FIG. 2 identifies the various stages of the foregoing sequence as it proceeds within the automated trading system 2. A first stage 1 is referred to as the publication stage, and can be performed by a trading requirements publication module 22 within the client transaction agent 4, as shown in FIG. 3. In the context of stage 1 of FIG. 2, publication refers to the transmittal of trading requirements by any suitable means from the client transaction agent 4 to the broker 6. The trading requirements will be prepared prior to publication, either manually by a human author, or automatically by an optional trading requirements generation module 23 of the client transaction agent 4, or by some other automated system (based on human-generated parameters). The trading requirements may be implemented as generalized guidelines for creating an automated service interface, but more preferably take the form of a detailed and unambiguous service interface specification.

This service interface specification provides a description of a particular automated interface that the client requires for automated trading with the supplier regarding some transaction subject. As indicated by way of summary above, the goal of the service interface specification is to allow the client to engage in one or more transactions with plural suppliers using a single automated trading application, thereby amortizing the resource overhead required to create the application over more than just a single supplier or transaction. Any conventional automated interface type could be used, provided the interface is one that a supplier would be willing to expose to clients who may be unfamiliar entities accessing the supplier's web or application server over a non-secure network connection. As described by way of background above, the SOAP protocol is widely used to implement object-oriented interfaces for automated transactions. The operations associated with SOAP interface objects can be defined using WSDL specification files written in WSDL format. Thus, one way that trading requirements could be defined would be in the form of WSDL specification files.

Figure 4A:
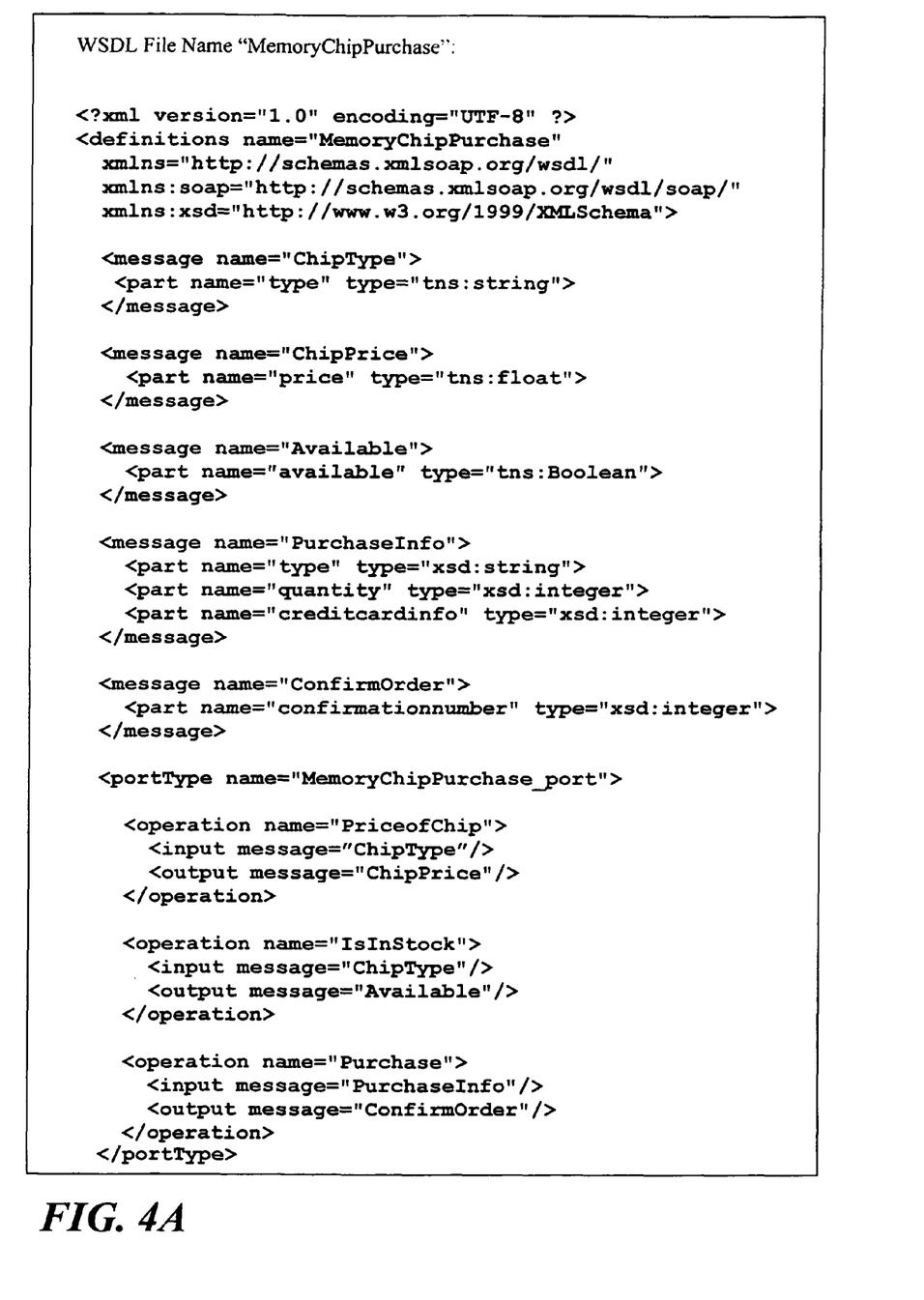
FIGS. 4A and 4B illustrate an exemplary WSDL file that illustrates one possible format that may be used for defining trading requirements.
Figure 4B:
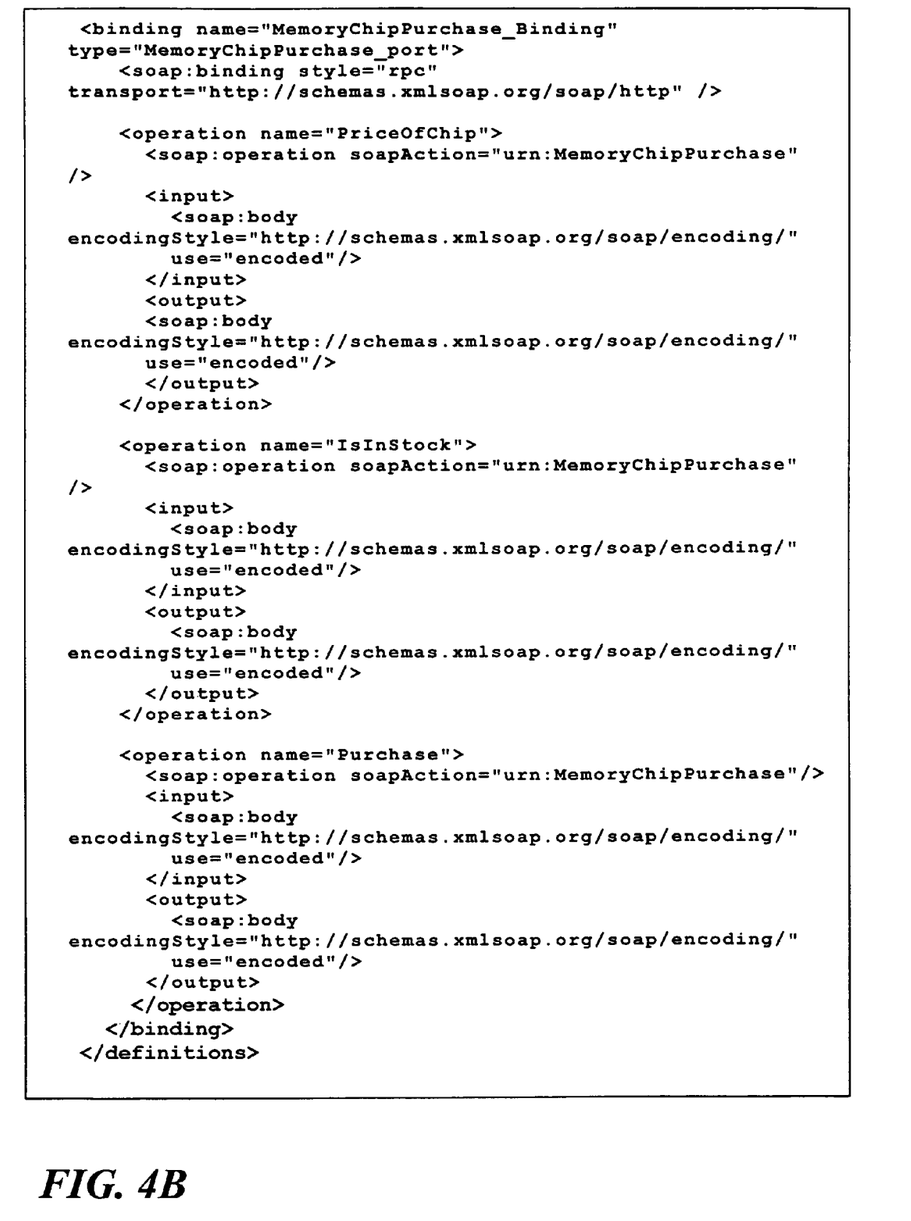

An exemplary WSDL file is listed in FIGS. 4A and 4B. This file specifies an automated service interface that an exemplary client computer manufacturer could use to acquire memory chips for use in building its computers. The specified automated service interface allows the client to inquire as to the price of particular types of memory chips, determine their availability, and execute purchase transactions. The illustrated WSDL file contains three operations, together with associated input and output messages that define the three required interface services. The first operation, called "PriceofChip," takes an input message called "ChipType" that is specified by the client and returns an output message called "ChipPrice." The second operation, called "IsInStock," takes the "ChipType" input message and returns an output message called "Available." The third operation, called "Purchase," takes an input message called "PurchaseInfo" that specifies a memory chip type, a purchase quantity, and credit card information. The Purchase operation returns an output message called "ConfirmOrder" that contains a purchase confirmation number. It will be seen that the WSDL file of FIGS. 4A and 4B also includes the usual namespace definitions ("xmlns") at the beginning of the file, a "portType" identification that precedes the operation definitions, and a "SOAP bindings" section at the end of the file that specifies a binding type ("RPC" (Remote Procedure Call)) and a transport mechanism ("HTTP").

Stage 1 of FIG. 2 is completed when the trading requirements are received at the broker 6 from the client transaction agent 4. FIG. 3 illustrates a trading requirements input module 24 within the broker 6 that receives the trading requirements from the trading requirements publication module 22. Any suitable transport mechanism may be used for this communication, including HTTP messages, SMTP messages, or other network communication formats. It will also be appreciated that the communication of trading requirements can be fully automated, or manually-assisted. As an example of the former case, the trading requirements publication module 22 could be an automated trading application and the trading requirements input module 24 could be an automated service interface (e.g., providing automated Web services). As an example of the latter case, the trading requirements publication module 22 could be a web browser controlled by a human operator and the trading requirements input module 24 could be a web server serving a suitable web page. As indicated, SMTP-based email exchange could also be used.

In stage 2 of FIG. 2, the broker 6 notifies the supplier transaction agents $8_1$-$8_n$ of the trading requirements received from the client transaction agent 4. This notification can be done in several ways. According to one approach, trading requirement notifications can be sent to one or more of the supplier transaction agents $8_1$-$8_n$ by a trading requirements notification module 26 in the broker 6. Information about which supplier transaction agents $8_1$-$8_n$ are to be sent notifications can be specified by the client transaction agent 4, or the recipients may be known by the broker 6. In the latter instance, knowledge of which supplier transaction agents $8_1$-$8_n$ should receive notifications could be learned by the broker 6 based on previous dealings with the client transaction agent 4, could be programmed into the broker (e.g. by programming personnel associated with the broker), or could be specified in advance by supplier transaction agents $8_1$-$8_n$ who have an interest in trading with particular clients.

Another way that the broker 6 could notify the supplier transaction agents $8_1$-$8_n$ of trading requirements would be to place them in a publicly accessible broker registry 28. This would allow interested supplier transaction agents $8_1$-$8_n$ to periodically scan the broker registry 28 for trading requirements posted by clients of interest. In this case, it will be appreciated that the broker 6 could be implemented as an enhanced UDDI registry that not only allows suppliers to identify themselves and their automated services, but also permits clients to register their trading requirements. By enhancing a UDDI registry in this manner, the registry could be used for brokering automated transactions among compatible trading partners. The broker registry 28 could thus be established for clients to publish trading requirements for consumption by suppliers. Moreover, as described in more detail below, the same broker registry 28 may be used by suppliers to register their services that conform to the trading requirements for consumption by clients.

Stage 2 of FIG. 2 is completed when the supplier transaction agents $8_1$-$8_n$ receive the trading requirement notifications. As shown in FIG. 3, each of the supplier transaction agents $8_1$-$8_n$ can implement a trading requirements acquisition module 30 for the purpose of either receiving notifications of trading requirements that are periodically sent by the broker's trading requirements notification module 26, or querying the broker registry 28 in order to initiate a request for trading requirements that may be of interest. Communication in both cases can be implemented using HTTP messages, SMTP messages, or other network communication formats. Thus, according to one implementation, each trading requirements acquisition module 30 could be an automated service interface (e.g., providing Web services) that waits for notification messages from the trading requirements notification module 26, which could be an automated transaction application. In an alternative implementation, each trading requirements acquisition module 30 could be an automated or manually-operated communication initiator (e.g., an automated trading application or a web browser) that queries the broker registry 28 for trading requirements information. The latter could maintain a front-end automated service interface or a web server serving a suitable web page. As indicated, SMTP-based email exchange could also be used.

In stage 3 of FIG. 2, suppliers who are interested in providing automated service interfaces that conform to the trading requirements can create such interfaces and register their services with the broker 6. For example, if the trading requirements are based on the exemplary WSDL file of FIGS. 4A and 4B, a number of computer memory chip suppliers might decide that they wish to create conforming automated service interfaces. Note that the trading requirements published by the client transaction agent 4 will typically contain information about the transport protocol and message encoding. The services provided by the supplier transaction agents $8_1$-$8_n$ will thus need to properly match the protocol and encoding, regardless of the form of the actual communication media.

Each such supplier can manually create their automated service interface based on human review of the trading requirements. Alternatively, the supplier transaction agents $8_1$-$8_n$ could potentially implement a service generation module 32 that generates service interfaces automatically. In the former case, the supplier transaction agents $8_1$-$8_n$ need only process the trading requirements for output in human-readable form to programming personnel associated with the suppliers. In the latter case, the supplier transaction agents $8_1$-$8_n$ must be programmed with intelligence for interpreting the trading requirements and generating a conforming automated service interface.

The registration of automated services is performed on the supplier side by a service registration module 34 that can be provided in each of the supplier transaction agents $8_1$-$8_n$. The broker 6 maintains a counterpart service registration module 36 that acts as a front end to the broker registry 28 and interacts with the service registration module 34 in each of the supplier transaction agents $8_1$-$8_n$. The modules 34 and 36 can be implemented as automated or manually-assisted transaction systems communicating by way of HTTP messages, SMTP messages, or other network communication formats. As an example of an automated implementation, the service registration module 36 in the broker 6 could be an automated service interface (e.g. providing Web services) and the service registration module 34 in each of the supplier transaction agents $8_1$-$8_n$ could be an automated transaction application. As an example of a manually-assisted implementation, the service registration module 36 in the broker 6 could be a web server serving a suitable web page and the service registration module 34 in each of the supplier transaction agents $8_1$-$8_n$ could be a human-operated web browser. As indicated, SMTP-based email exchange could also be used.

Any suitable information content can be used to identify and register automated services specified by the various supplier transaction agents $8_1$-$8_n$. By way of example only, a network resource locator, such as a URL (Uniform Resource Locator) address could be used. Thus, the broker registry 28 could be implemented as a database that stores URL addresses, each of which corresponds to a particular automated service registered by one of the supplier transaction agents $8_1$-$8_n$. Note that a URL address provides a full identification of an automated service interface from the client's perspective because that address contains the port that listens for incoming messages seeking to invoke the automated services. It will be appreciated that other types of network resource locators, such as email addresses, could also be used to identify and register automated services in the broker registry 28. Moreover, instead of URLs, raw IP (Internet Protocol) addresses could be used.

Each entry in the broker registry 28 will be associated with an identification of the corresponding trading requirements for which that entry's automated services were written. This allows the client transaction agent 4 to easily peruse the broker registry entries to collect all service identifications corresponding to the trading requirements, as will now be described.

In stage 4 of FIG. 2, the client transaction agent 4 collects all registration entries from the broker registry 28 that identify automated services conforming to the client's published trading requirements. A service collection module 38 in the client transaction agent 4 communicates with the broker registry 28 to obtain the required service information. For this purpose, the service collection module 38 can be implemented as an automated or manually-assisted transaction system communicating with the broker registry by way of HTTP messages, SMTP messages, or other network communication formats. As an example of an automated implementation, the service collection module 38 could be an automated trading application that accesses an automated service interface to the broker registry 28. As an example of a manually-assisted implementation, the service collection module 38 could be a human-operated web browser that accesses a web server associated with the broker registry 28 that serves a suitable web page. As indicated, SMTP-based email exchange could also be used.

In stage 5 of FIG. 2, the client transaction agent 4 (or another automated trading application associated with the same client) runs a data collection module 40 to access automated service interfaces corresponding to the service identifications collected during stage 4. The data collection module 40 executes a portion of the trading requirements that is associated with determining a supplier's ability to offer a particular transaction subject matter and the conditions under which such subject can be acquired. The data collection module 40 will send appropriate messages according to the trading requirements to the network locations where the registered automated services are implemented. In FIG. 3, each of the supplier transaction agents $8_1$-$8_n$ is shown to include an automated service interface 42 that runs the automated service conforming to the trading requirements. However, the automated service interfaces need not be part of the supplier transaction agents $8_1$-$8_n$ and could be situated within any other server system controlled by the supplier. Each automated service interface will provide responsive messages as dictated by the trading requirements to which they conform.

If, according to the memory chip purchase example given above, the trading requirements are based on the WSDL file of FIGS. 4A and 4B for use by a computer manufacturer, the data collection module 40 would invoke the "PriceofChip" and "Available" operations with respect to a specified memory chip type. Each registered automated service that conforms to the trading requirements would return price and availability information for that chip type.

In stage 6 of FIG. 2, the client transaction agent 4 (or another automated trading application associated with the same client) runs a decision module 44 that evaluates the information returned by the data collection module 40. According to the memory chip purchase example given above, the decision module 44 would compare the price and availability information provided by the various memory chip suppliers and select the best candidate.

In stage 7 of FIG. 2, the client transaction agent 4 (or another automated trading application associated with the same client) will contact the registered automated service interface associated with the selected supplier, this time using a transaction module 46 that is responsible for executing the portion of the trading requirements that is associated with consummating an automated transaction. The transaction module 46 will thus send one or more messages according to the trading requirements to the network location where the registered automated service for the selected supplier is implemented. The latter will return one or more response messages to the transaction module 46.

According to the memory chip purchase example given above, the transaction module 46 would invoke the "Purchase" operation associated with the automated service interface of the selected supplier. This operation would specify the requested memory chip type, a purchase quantity, and credit card information. The supplier's automated service interface would respond with a confirmation message that contains an order confirmation number, and the automated transaction would be thereby completed.

It will be seen from the foregoing description that the automated trading system 2 provides a number of features and advantages over the current automated trading paradigm. In particular, a client only needs to implement a single set of trading code modules (e.g., the modules 40, 44 and 46) even though the client needs to deal with a number of different suppliers. The trading modules can also be reused to acquire different transaction subject matter by making modifications thereto. It will also be seen that the operations of the automated trading system 2 can be entirely, or nearly entirely, automated. The operational aspects that may be best suited for human intervention rather than automated implementation are the creation of trading requirements and the creation of conforming automated services. However, even assuming human intervention is used for these two operations, all remaining actions of the system 2 can flow in an automated fashion.

3. Second Exemplary Embodiment

Figure 5:
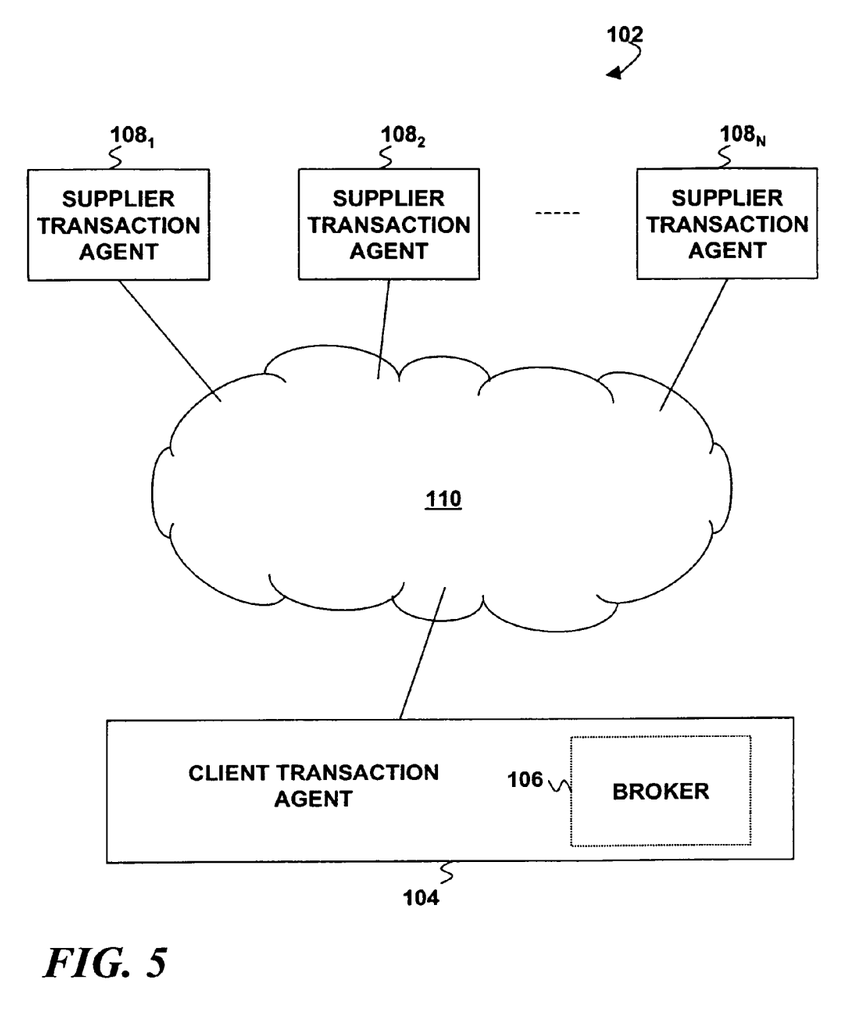
FIG. 5 is a functional block diagram showing a second embodiment of a client-oriented, on-demand automated trading system that contains a client transaction agent, a broker module within the client transaction agent, and plural supplier transaction agents.
Figure 6:
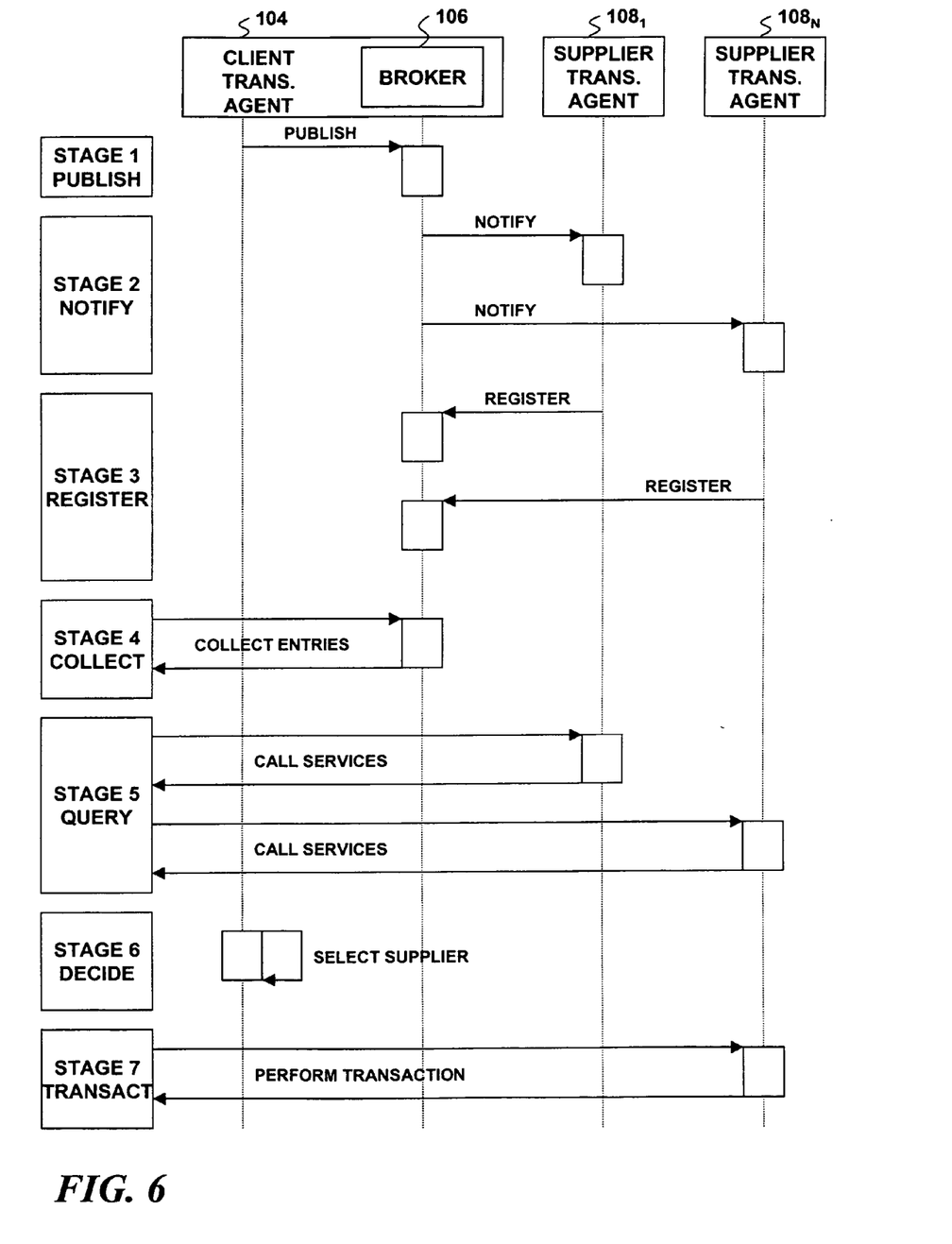
FIG. 6 is a flow diagram showing a sequence of actions performed by the client transaction agent, the broker and the plural supplier transaction agents according to the embodiment of FIG. 5.
Figure 7:
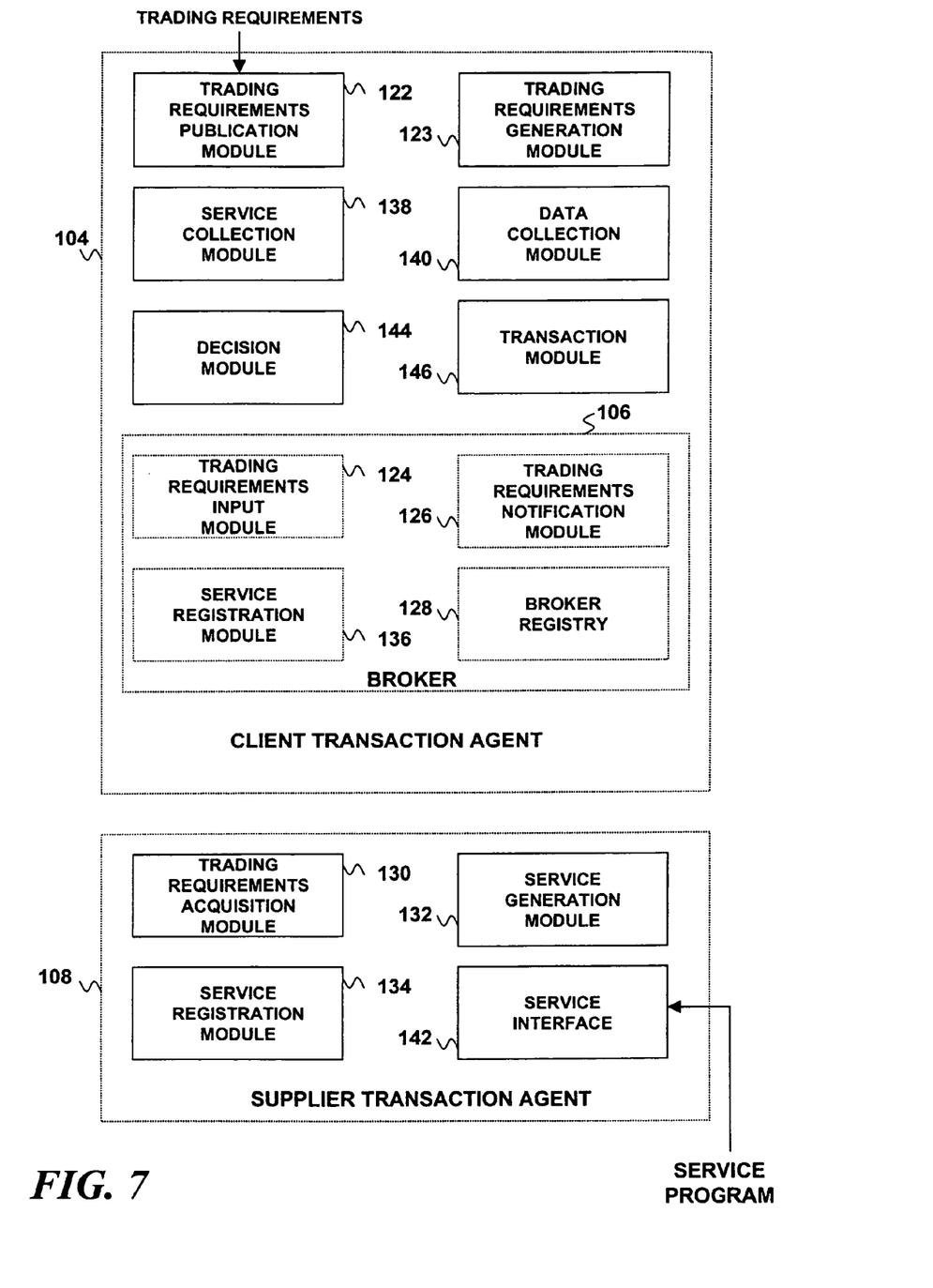
FIG. 7 is a functional block diagram showing components of the client transaction agent, the broker and a supplier transaction agent according to the embodiment of FIG. 4.

Turning now to FIGS. 5, 6 and 7, a second exemplary embodiment of the invention is shown by way of an automated transaction system 102. The system 102 is distinguishable from the automated transaction system 2 of the first exemplary embodiment by virtue of the fact that the client transaction agent 104 incorporates the broker function as an internal broker module 106. This means that the system 102 does not require a separate broker, but could optionally contain one if desired for the benefit of other client transaction modules (not shown) that do not maintain their own broker module. An additional separate broker could potentially also provide better propagation of trading requirements than the broker module 106 could achieve alone. In all other respects, the system 102 is configured to operate in the same manner as the system 2, as shown by the use of corresponding reference numbers (incremented by 100) in FIGS. 5, 6 and 7. Note that the broker module 106 of FIG. 7 can be implemented so as to perform all of the same functions as the broker 6 of FIG. 2. FIG. 7 thus shows the broker module 106 as incorporating functional modules 124, 126, 128 and 136 that are counterparts to the modules 24, 26, 28 and 36 of FIG. 3.

The incorporation of the broker module 106 in the client transaction agent 4 allows clients who may be large corporations, governments or other entities, to disseminate their own notifications of trading requirements to suppliers. In that case, interested suppliers may be expected to either periodically consult the broker module 106 to learn of new trading requirements, or the client broker module could send out notifications of trading requirements to suppliers that are known to it. Trading requirements can be published to the broker module 106 by way of a simple transfer from the trading requirements publication module 122. Alternatively, the trading requirements publication module 122 could be dispensed with and trading requirements could be input directly into the broker module 106. Note, however, that the trading requirements publication module 122 can still be used to publish trading requirements to a remote broker, if it is present in the system 102.

4. Conclusion

It will thus be seen that a client desiring to engage in automated trading can be empowered to drive the trading process as it wishes. In accordance with the various embodiments of the invention, the client simply needs to produce trading requirements that allow its client transaction agent to evaluate suppliers on a competitive basis, and establish a set of criteria that the client transaction agent can use to decide which supplier to select for trading. A separate broker and/or a broker module within the client transaction agent serves as a moderator between the client transaction agent and various supplier transaction agents. The broker function assists the client transaction agent to publish the trading requirements to the supplier transaction agents so that potential suppliers understand what fixed set of automated services the client needs. The broker function also keeps track of interested suppliers, along with identifications of their services conforming to the trading requirements. As seen by virtue of the two exemplary embodiments disclosed herein, the broker function can either be remote from the client transaction agent or incorporated therein as a module, or both. The suppliers simply need to generate automated service interfaces that conform to the trading requirements, and register the services with the broker function(s) via the supplier transaction agents. The supplier transaction agents (or other automated entities) that implement the automated service interfaces on behalf of the suppliers can then wait for client inquiries, and execute automated transactions if they are selected by the client.

Figure 8:
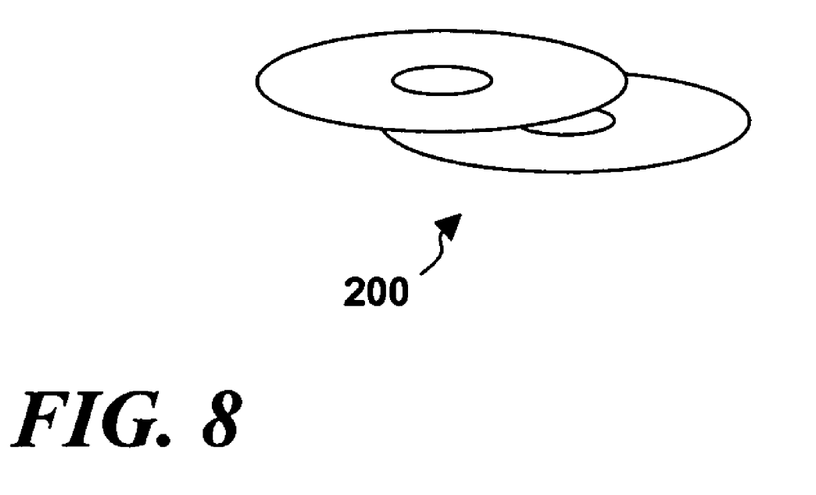
FIG. 8 is a diagrammatic illustration of storage media that can be used to store a computer program product for implementing (collectively or separately) a client transaction agent, a broker and a supplier transaction agent.

Accordingly, a client-oriented automated trading system along with its various components has been disclosed. It will be appreciated that the inventive concepts may be variously embodied in any of a data processing system, a machine implemented method, and a computer program product in which programming means are recorded on one or more data storage media for use in controlling a data processing system to perform the required functions. Exemplary data storage media for storing the programming means are shown by reference numeral 200 in FIG. 8. The media 200 are shown as being portable optical storage disks of the type that are conventionally used for commercial software sales. Such media can separately (or collectively) store the programming means that define a client transaction agent computer program product, a broker computer program product, and a supplier transaction agent computer program product. These programming means could also be stored on portable magnetic media (such as floppy disks, flash memory sticks, etc.) or on magnetic media combined with drive systems (e.g. disk drives) incorporated in computer platforms.

While several embodiments of the invention have been shown and described, it should be apparent that many variations and alternative embodiments could be implemented. It is understood, therefore, that the invention is not to be in any way limited except in accordance with the spirit of the appended claims and their equivalents.

What is claimed is:

1. An automated trading support method, comprising, prior to the commencement of said automated trading:
   notifying one or more machine-implemented supplier transaction agents of trading requirements specified by a machine-implemented client transaction agent, said notifying comprising communicating said trading requirements in computer-readable form to said one or more supplier transaction agents;
   said trading requirements comprising interface description information for creating an automated service interface that interoperates with an automated trading application implemented by or on behalf of a client;
   said automated service interface implementing one or more interface operations that said client automated trading application can invoke to facilitate product or service acquisition;
   advising said client transaction agent of automated services offered by or on behalf of one or more suppliers that conform to said trading requirements, said advising comprising communicating information about said automated services in computer-readable form to said client transaction agent; and
   whereby said client automated trading application can subsequently invoke said automated services to perform said automated trading.

2. A method in accordance with claim 1 wherein said trading requirements comprise an automated service interface specification file and wherein said method further comprises receiving said automated service interface specification file in computer-readable form from said client transaction agent prior to notifying said one or more supplier transaction agents.

3. A method in accordance with claim 1 further including registering one or more automated service identifications that identify said automated services for advising said client transaction agent of said automated services, said registering comprising storing information about said one or more automated service identifications in computer-readable form on a computer-readable storage medium.

4. A method in accordance with claim 3 wherein said registering includes storing said one or more automated service identifications in a registration database.

5. A method in accordance with claim 4 wherein said advising includes providing said one or more automated service identifications from said registration database.

6. A method for brokering support for automated transactions among compatible trading partners, comprising, prior to the commencement of said automated trading:
   establishing a broker registry comprising a computer-readable storage medium;
   publishing trading requirements in said registry for consumption by one or more supplier transaction agents, said publishing comprising receiving said trading requirements in computer-readable form for storage in said registry;
   said trading requirements comprising interface description information for creating an automated service interface that interoperates with an automated trading application implemented by or on behalf of a client;

said automated service interface implementing one or more interface operations that said client automated trading application can invoke to facilitate product or service acquisition;

registering automated services that conform to said trading requirements in said registry, said registering comprising storing information about said automated services in computer-readable form in said registry; and whereby said client automated trading application can subsequently invoke said automated services to perform said automated trading.

7. A client transaction support method for use in an automated trading system that facilitates client-oriented automated trading with suppliers, comprising, prior to the commencement of said automated trading:

publishing trading requirements for notification to one or more supplier transaction agents, said publishing comprising communicating or transferring or inputting said trading requirements in computer-readable form for storage on a computer-readable storage medium;

said trading requirements comprising interface description information for creating an automated service interface that interoperates with an automated trading application implemented by or on behalf of a client;

said automated service interface implementing one or more interface operations that said client automated trading application can invoke to facilitate product or service acquisition;

collecting information about automated services provided by or on behalf of one or more suppliers that conform to said trading requirements, said collecting comprising receiving said information in computer-readable form; and whereby said client automated trading application can subsequently invoke said automated services to perform said automated trading.

8. A supplier transaction support method for use in an automated trading system that facilitates client-oriented automated trading with suppliers, comprising, prior to the commencement of said automated trading:

receiving trading requirements in computer-readable form specified by a machine-implemented client transaction agent;

said trading requirements comprising interface description information for creating an automated service interface that interoperates with an automated trading application implemented by or behalf of a client;

said automated service interface implementing one or more interface operations that said client automated trading application can invoke to facilitate product or service acquisition;

registering automated services that conform to said trading requirements with a broker, said registering comprising storing information about said automated services in computer-readable form on a computer-readable storage medium; and whereby said automated trading application can subsequently invoke said automated services to perform said automated trading.

9. An automated trading support and implementation system, comprising:

a machine-implemented client transaction agent;

one or more machine-implemented supplier transaction agents;

a machine-implemented broker operative prior to the commencement of said automated trading to notify said one or more supplier transaction agents of trading requirements specified by said client transaction agent and to advise said client transaction agent of automated services offered by said one or more supplier transaction agents that conform to said trading requirements;

said notify operation comprising communicating said trading requirements in computer-readable form to said one or more supplier transaction agents;

said advise operation comprising communicating information about said automated services in computer-readable form to said client transaction agent;

said trading requirements comprising interface description information for creating an automated service interface that interoperates with an automated trading application implemented on behalf of a client by said client transaction agent;

said automated service interface implementing one or more interface operations that said client automated trading application can invoke to facilitate product or service acquisition; and whereby said client automated trading application can subsequently invoke said automated services to engage in said automated trading.

10. A system in accordance with claim 9 wherein said broker is either remote from said client transaction agent or incorporated therein.

11. A system in accordance with claim 9 wherein said client transaction agent is adapted to publish an automated service interface specification containing said trading requirements to said broker and to collect one or more automated service identifications identifying said automated services from said broker, said publish operation comprising communicating or transferring or inputting said trading requirements in computer-readable form for storage on a computer-readable storage medium, and said collect operation comprising communicating a request for said information in computer-readable form to initiate said advise operation.

12. A system in accordance with claim 9 wherein said one or more supplier transaction agents are operative to register automated service identifications identifying said automated services at said broker, said register operation comprising communicating information about said automated services in computer-readable form for storage on a computer-readable storage medium.

13. A system in accordance with claim 9 wherein said broker is operative to maintain a registry of automated service identifications provided by said one or more supplier transaction agents, said registry comprising a computer-readable storage medium.

14. A machine-implemented client transaction agent for use in an automated trading support system that facilitates client-oriented automated trading with suppliers, comprising:

a data processing system;

publication means implemented by said data processing system prior to the commencement of said automated trading for publishing trading requirements for notification to one or more machine-implemented supplier transaction agents, said publishing comprising a communication or transfer or input of said trading requirements in computer-readable form for storage on a computer-readable storage medium;

said trading requirements comprising interface description information for creating an automated service interface that interoperates with an automated trading application implemented on behalf of a client by said client transaction agent;

said automated service interface implementing one or more interface operations that said client automated trading application can invoke to facilitate product or service acquisition;

collection means implemented by said data processing system prior to the commencement of said automated trading for collecting information about automated services provided by said one or more suppliers that conform to said trading requirements, said collecting comprising receiving said information about automated services in computer-readable form; and whereby said client automated trading application can subsequently invoke said automated services to perform said automated trading.

15. A client transaction agent in accordance with claim 14 wherein said publication means comprises means for publishing an automated service interface specification containing said trading requirements to a remote machine-implemented broker that notifies said one or more supplier transaction agents thereof by communicating said automated service interface specification in computer-readable form, and wherein said collection means comprises means for collecting one or more automated service identifications that identify said automated services from said remote broker, said collecting comprising requesting and receiving said automated service identifications in computer-readable form.

16. A client transaction agent in accordance with claim 14 wherein said publication means comprises means for publishing an automated service interface specification containing said trading requirements to a machine-implemented broker module within said client transaction agent that notifies said one or more supplier transaction agents thereof by communicating said automated service interface specification in computer-readable form, and wherein said collection means comprises means for collecting one or more automated service identifications that identify said automated services from said broker module, said collecting comprising requesting and receiving said automated service identifications in computer-readable form.

17. A client transaction agent in accordance with claim 14 further including data accessing means implemented by said data processing system for accessing said automated services provided by said one or more suppliers to obtain information regarding a transaction subject of interest to said client, said accessing comprising communicating with said automated service interface associated with said one or more suppliers.

18. A client transaction agent in accordance with claim 17 further including decision means implemented by said data processing system for evaluating said information to determine a most suitable supplier for a transaction concerning said subject and transaction means implemented by said data processing system for consummating a transaction concerning said subject with said most suitable supplier, said evaluating comprising comparing information obtained from said automated service interface for said one or more suppliers and said consummating comprising invoking a consummation operation implemented by said automated service interface associated with said most suitable supplier.

19. A computer program product for programming a client transaction agent that comprises a data processing system for use in an automated trading support system that facilitates client-oriented automated trading with suppliers, comprising:

one or more computer-readable data storage media;

programming means recorded on said data storage media for programming said client transaction agent to operate prior to the commencement of said automated trading, as by:

publishing trading requirements for notification to one or more supplier transaction agents, said publishing comprising a communication or transfer or input of said trading requirements in computer-readable form for storage on a computer-readable storage medium;

said trading requirements comprising interface description information for creating an automated service interface that interoperates with an automated trading application implemented on behalf of a client by said client transaction agent;

said automated service interface implementing one or more interface operations that said client automated trading application can invoke to facilitate product or service acquisition;

collecting information about automated services provided by one or more suppliers that conform to said trading requirements, said collecting comprising receiving said information about automated services in computer-readable form; and whereby said client automated trading application can subsequently invoke said automated services to perform said automated trading.

20. A computer program product in accordance with claim 19 wherein said programming means further comprises means for programming said client transaction agent to publish said trading requirements by publishing an automated service interface specification containing said trading requirements to a remote machine-implemented broker that notifies said one or more supplier transaction agents thereof by communicating said automated service interface specification in computer-readable form, and wherein said programming means further comprises means for programming said client transaction agent to collect information about said automated services by collecting one or more automated service identifications that identify said automated services from said remote broker, said collect operation comprising requesting and receiving said automated service identifications in computer-readable form.

21. A computer program product in accordance with claim 19 wherein said programming means further comprises means for programming said client transaction agent to publish said trading requirements by publishing an automated service interface specification containing said trading requirements to a machine-implemented broker module within said client transaction agent that notifies said one or more supplier transaction agents thereof by communicating said automated service interface specification in computer-readable form, and wherein said programming means further comprises means for programming said client transaction agent to collect information about said automated services by collecting one or more automated service identifications that identify said automated services from said broker module, said collect operation comprising requesting and receiving said automated service identifications in computer-readable form.

22. A computer program product in accordance with claim 19 wherein said programming means further comprises means for programming said client transaction agent to operate as by accessing said automated services provided by said one or more suppliers to obtain information regarding a transaction subject of interest to said client, said accessing comprising communicating with said automated service interface associated with said one or more suppliers.

23. A computer program product in accordance with claim 22 wherein said programming means further comprises means for programming said client transaction agent to operate as by evaluating said information to determine a most suitable supplier for a transaction concerning said subject and consummating a transaction concerning said subject with said most suitable supplier, said evaluating comprising comparing information obtained from said automated service interface for said one or more suppliers and said consummating comprising invoking a consummation operation implemented by said automated service interface associated with said most suitable supplier.

24. A machine-implemented broker for use in an automated trading support system that facilitates client-oriented automated trading with suppliers, comprising:
- a data processing system;
- notification means implemented by said data processing system prior to the commencement of said automated trading for notifying one or more machine-implemented supplier transaction agents of trading requirements received from a machine-implemented client transaction agent, said notifying comprising communicating said trading requirements in computer-readable form to said one or more supplier transaction agents;
- said trading requirements comprising interface description information for creating an automated service interface that interoperates with an automated trading application implemented on behalf of a client by said client transaction agent;
- said automated service interface implementing one or more interface operations that said client automated trading application can invoke to facilitate product or service acquisition;
- registration means implemented by said data processing system prior to the commencement of said automated trading for registering automated services provided by one or more of said suppliers that conform to said trading requirements, said registering comprising storing information about said automated services in computer-readable form on a computer-readable data storage medium;
- advising means implemented by said data processing system prior to the commencement of said automated trading for advising said client transaction agent about said registered automated services, said advising comprising communicating information about said registered automated services in computer-readable form; and
- whereby said client automated trading application can subsequently invoke said automated services to perform said automated trading.

25. A broker in accordance with claim 24 wherein said broker is remote from said client transaction agent.

26. A broker in accordance with claim 24 wherein said broker is situated in said client transaction agent.

27. A broker in accordance with claim 24 wherein said registration means comprises a registration database that stores automated service identifications.

28. A broker in accordance with claim 27 wherein said advising means comprises a collection interface that said client transaction agent can access to collect registration database entries.

29. A computer program product for programming a broker for use in an automated trading support system that facilitates client-oriented automated trading with suppliers, comprising:
- one or more computer-readable data storage media;
- programming means recorded on said data storage media for programming said broker to operate prior to the commencement of said automated trading, as by:
  - notifying one or more machine-implemented supplier transaction agent, of trading requirements received from a machine-implemented client transaction agent said notifying comprising communicating said trading requirements in machine-readable form to said one or more supplier transaction agents;
  - registering automated services provided by one or more of said suppliers that conform to said trading requirements, said registering comprising storing information about said automated services in computer-readable form on a computer-readable data storage medium;
  - said trading requirements comprising interface description information for creating an automated service interface that interoperates with an automated trading application implemented on behalf of a client by said client transaction agent;
  - said automated service interface implementing one or more interface operations that said client automated trading application can invoke to facilitate product or service acquisition;
  - advising said client transaction agent about said registered automated services, said advising comprising communicating information about said registered automated services in computer-readable form;
  - whereby said client automated trading program can subsequently invoke said automated services to perform said automated trading.

30. A computer program product in accordance with claim 29 wherein said programming means is for programming said broker to operate remotely from said client transaction agent.

31. A computer program product in accordance with claim 29 wherein said programming means is part of a computer program product for programming said client transaction agent.

32. A computer program product in accordance with claim 29 wherein said programming means further comprises means for programming said broker to register said automated services by way of a registration database that stores automated service identifications.

33. A computer program product in accordance with claim 29 wherein said programming means further comprises means for programming said broker to advise said client transaction agent about said registered automated services by providing a collection interface that said client transaction agent can access to collect registration database entries.

34. A machine-implemented supplier transaction agent for use in an automated trading support system that facilitates client-oriented automated trading with suppliers, comprising:
- a data processing system;
- receiving means implemented by said data processing system prior to the commencement of said automated trading for receiving trading requirements in computer-readable form generated by a machine-implemented client transaction agent;
- said trading requirements comprising interface description information for creating an automated service interface that interoperates with an automated trading application implemented on behalf of a client by said client transaction agent;
- said automated service interface implementing one or more interface operations that said client automated trading application can invoke to facilitate product or service acquisition;
- registration means implemented by said data processing system prior to the commencement of said automated trading for registering automated services that conform to said trading requirements with a machine-implemented broker, said registering comprising communicating information about said automated services in computer-readable form for storage on a computer-readable storage medium associated with said broker; and whereby said client automated trading application can subsequently invoke said automated services to perform said automated trading.

35. A supplier transaction agent in accordance with claim 34 wherein said receiving means comprises means for receiving an automated service interface specification.

36. A supplier transaction agent in accordance with claim 34 wherein said registration means comprises means for providing an automated services identification that can be accessed by said client transaction agent.

37. A supplier transaction agent in accordance with claim 36 wherein said automated services identification is a network resource locating address.

38. A supplier transaction agent in accordance with claim 34 further including means for generating said automated services using said trading requirements.

39. A computer program product for programming a supplier transaction agent for use in an automated trading support system that facilitates client-oriented automated trading with suppliers, comprising:

one or more data storage media;

programming means recorded on said data storage media for programming said client transaction agent to operate prior to the commencement of said automated trading, as by:

receiving trading requirements in computer-readable form generated by a machine-implemented client transaction agent;

said trading requirements comprising interface description information for creating an automated service interface that interoperates with an automated trading application implemented on behalf of a client by said client transaction agent;

said automated service interface implementing one or more interface operations that said client automated trading application can invoke to facilitate product or service acquisition;

registering automated services that conform to said trading requirements with a machine-implemented broker, said registering comprising communicating information about said automated services in computer-readable form for storage on a computer-readable storage medium associated with said broker; and whereby said client automated trading application can subsequently invoke said automated services to perform said automated trading.

40. A computer program product in accordance with claim 39 wherein said programming means further comprises means for programming said supplier transaction agent to receive said trading requirements by receiving an automated service interface specification.

41. A computer program product in accordance with claim 39 wherein said programming means further comprises means for programming said supplier transaction agent to register said automated services by providing a automated services identification that can be accessed by said client transaction agent.

42. A computer program product in accordance with claim 39 wherein said programming means further comprises means for programming said supplier transaction agent to register said automated services by providing a network resource locating address that can be accessed by said client transaction agent.

43. A computer program product in accordance with claim 39 wherein said programming means further comprises means for programming said supplier transaction agent to generate said automated services using said trading requirements.

* * * * *